UNITED STATES PATENT OFFICE.

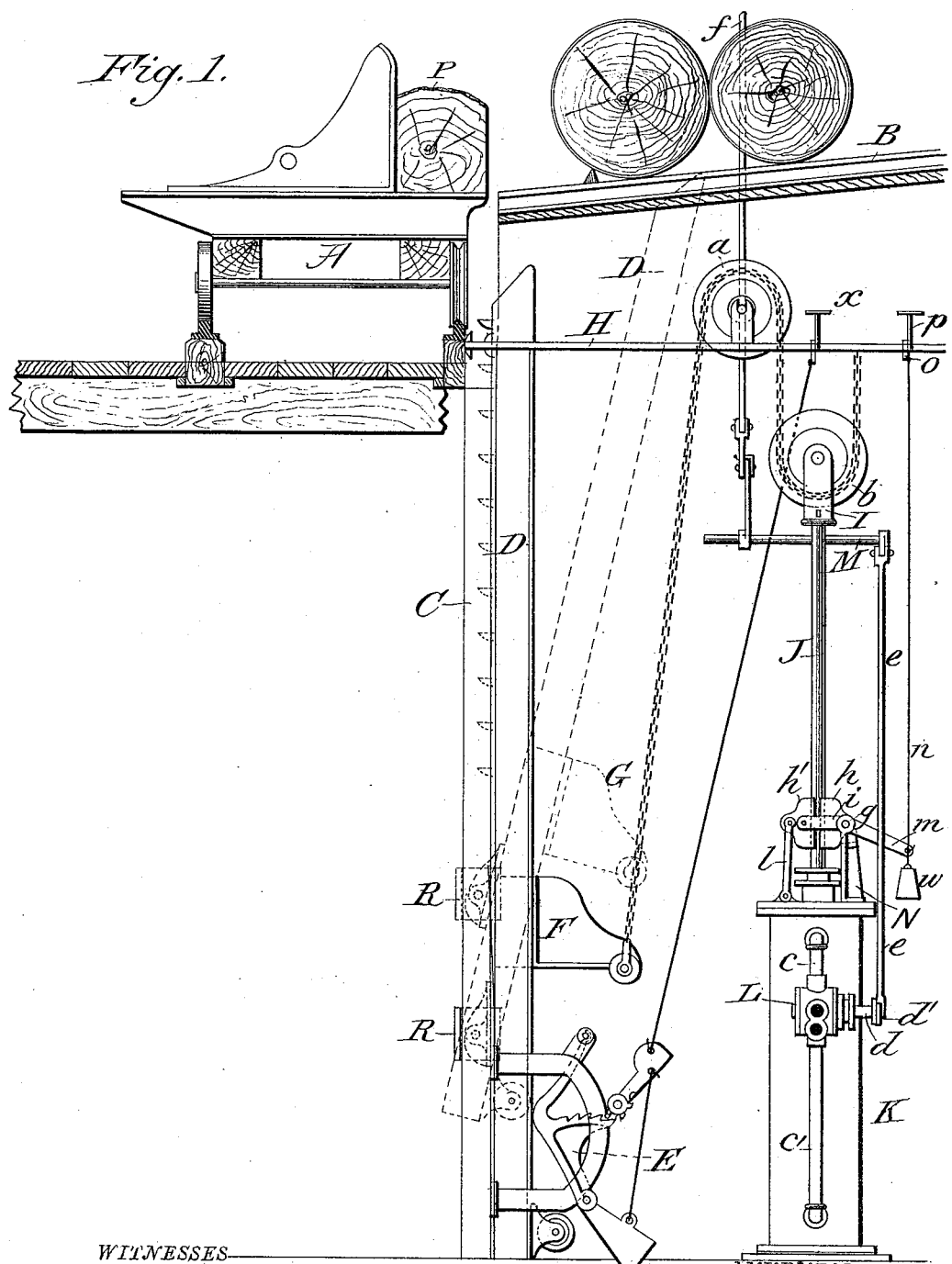

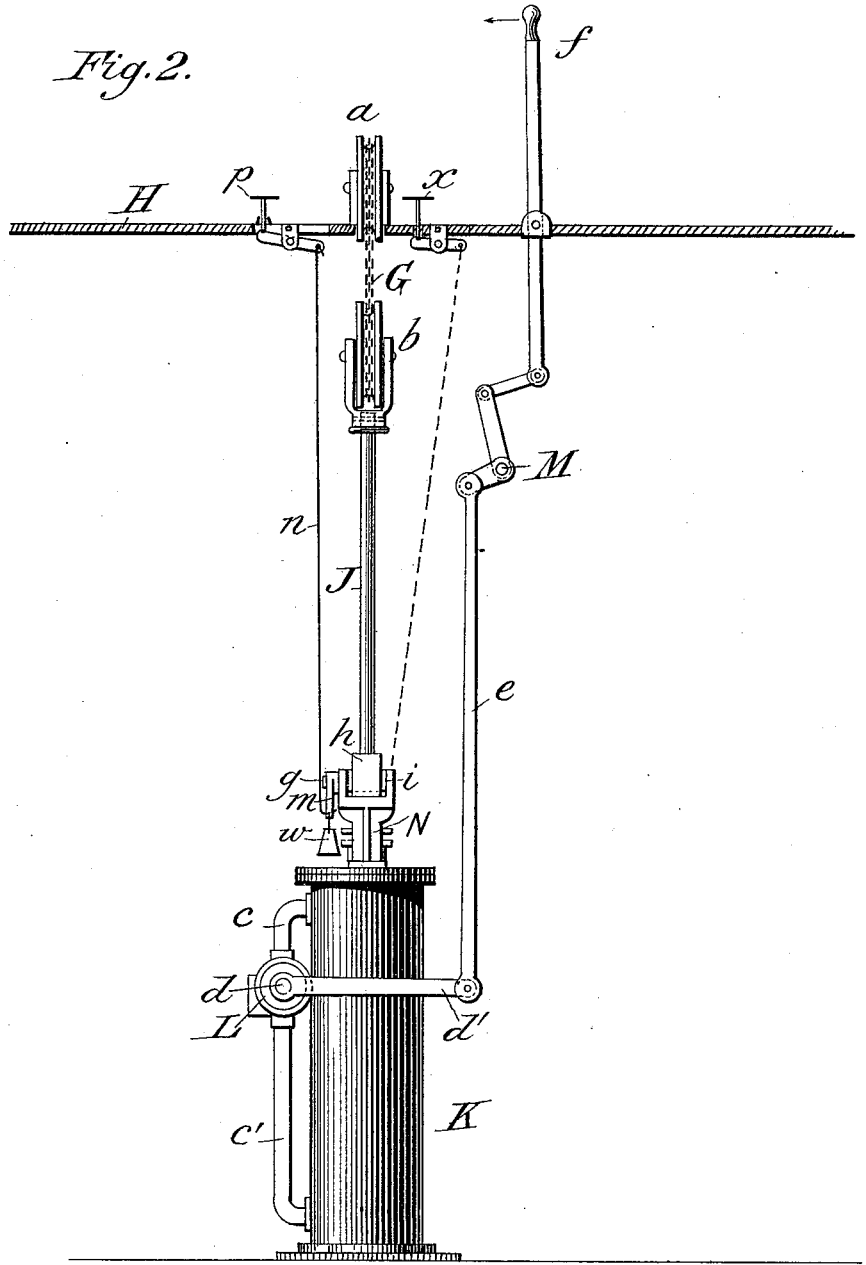

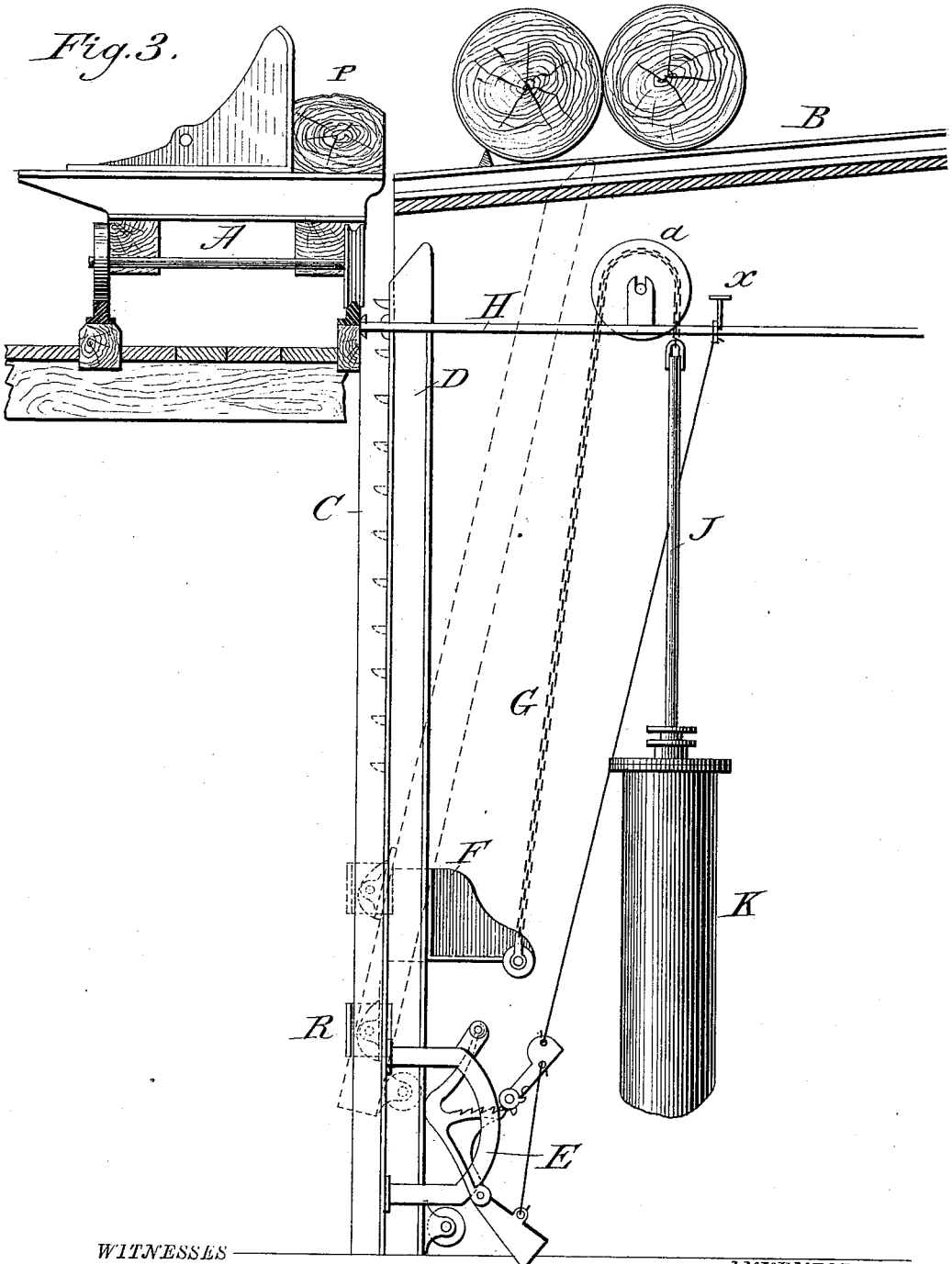

ALEXANDER RODGERS, OF MUSKEGON, MICHIGAN.

LOG-TURNER.

SPECIFICATION forming part of Letters Patent No. 337,705, dated March 9, 1886.

Application filed September 12, 1885. Serial No. 176,883. (No model.)

*To all whom it may concern:*

Be it known that I, ALEXANDER RODGERS, a citizen of the United States, residing at Muskegon, in the county of Muskegon and State of Michigan, have invented certain new and useful Improvements in Machines for Turning Logs, of which the following is a specification, reference being had therein to the accompanying drawings.

This invention relates to an improvement in that class of log-turners in which the vertical and oscillatory movements of the toothed bar are imparted by the action of steam, either directly upon a piston attached to the bar or connected with it by an arrangement of levers. These machines, which have been brought into extensive use, are found to be rigid in action and lacking in that pliability and ease of movement found in the old style of machines which were operated by a chain or rope attached to some part of the toothed bar and put in motion by winding the same upon a windlass. In order therefore to combine the advantages of both styles of machines, I have invented the arrangement of parts hereinafter fully described, in which the steam-cylinder and toothed bar are retained, but the connection is made between them by means of a chain, instead of the system of levers or direct attachment heretofore employed for that purpose.

In the accompanying drawings, Figure 1 is a transverse section through the floor of a mill, showing one end of the log-carriage, the toothed bar, and the mechanism by which it is operated. Fig. 2 shows a rear view of the cylinder, the brake mechanism, and means by which the brake and valve may be operated; and Fig. 3 shows a modification in which a longer cylinder is used, thus dispensing with the duplicating gear, as the piston has the same stroke as the toothed bar.

In these several figures, A represents the log-carriage, and B the logway of a saw-mill. C are the vertical posts, which act as supports and guides for the toothed bar D. At the lower end of the bar is preferably arranged the apparatus shown at E, commonly called a "trip," for giving any desired amount of oscillatory or swinging movement to the same when needed. All of these parts are old and well known in the art, and do not therefore need any specific description.

I will therefore now proceed to describe the novel parts of the machine and their connections with the old and well-known devices.

Attached to the bar D, near its lower end, is a knee, F, projecting rearwardly from the same, and to the outer extremity of which is attached one end of the operating-chain G. This chain passes upward over the sheave $a$, journaled in suitable supports on the beam H, and thence down and around the sheave $b$, attached by means of the bifurcated coupling I to the upper end of the piston-rod J, and thence to the beam H, where its other end is secured. It will thus be seen that the sheave $b$, attached to the end of the piston-rod, rests in a bight of the chain G, and that any vertical movement of said rod is duplicated by the bar D, making it necessary to give the piston only one-half the stroke required for said bar. A vertical cylinder, K, is placed directly beneath the sheave $b$, to which, as before stated, its piston-rod is connected. This cylinder is provided with the valve-chest L, connected with the opposite ends of said cylinder by the steam and exhaust pipes $c$ and $c'$.

It will be evident that the cylinder could, if desired, be cast with the valve-chest, steam and exhaust passages integral therewith; but owing to the great length of the cylinder in comparison with its diameter, I prefer to make them separate and connect them therewith, as shown.

The valve preferred is an oscillating one that has attached to its stem $d$ an arm, $d'$, to which is connected the rod $e$, which rod is attached at its opposite end to one arm of the rock-shaft M, the other arm of which is connected by suitable devices with the handle $f$, placed in such a position as to be readily reached and manipulated by the sawyer when he wishes to turn the log upon the carriage or to roll a new one thereon.

Attached to or preferably forming a part of the upper cylinder-head is the support N, in the upper part of which is journaled the ends of an eccentric-shaft, $g$. This shaft carries a brake-shoe, $h$, and is also connected by the links $i\ i$ with a second brake-shoe, $h'$, that is supported upon the vibrating supports or links *l*, which are pivoted at one end to the brake-shoe and at the other to the cylinder-head. These brake-shoes are of considerable length, and are grooved out on the sides next to the piston-rod, so that when brought into action they nearly embrace the whole circumference thereof. Attached to the eccentric shaft *g* is an arm or lever, *m*, that is connected at its outer end with a chain, *n*, the upper extremity of which is attached to one end of a horizontal lever, *o*, the opposite end of which engages with the lower end of the foot-step *p*, that is also brought into a convenient position for the sawyer's use. In order that the brake may be released automatically, a weight, *w*, may be attached to the lever *m*, which, when the foot is taken off the step *p*, will release the brakes. An additional foot-step, *x*, operates the trip E in the ordinary well-known manner.

The operation of the machine is as follows: If it is desired to turn a log, as P, upon the head-blocks of the log-carriage, the parts of the apparatus being in a state of rest and in the position shown in full lines in Fig. 1, the piston of the steam-cylinder at the top of its stroke and the bar D in its lower position, the lever *f* is operated, and through the intervening connections opens the valve in steam-chest L and admits steam to the upper end of the cylinder, which depresses the piston, and, acting through its connections therewith, raises the bar D, which, being pivoted upon trunnions in the cross-head R, has a tendency to tip forward as it rises, causing the teeth of the bar to take a firm hold of the log, and, as the bar continues to rise, the log is rolled over upon the head-blocks. A reverse movement of the hand-lever *f* then closes the steam-port and opens the exhaust, when the weight of the bar is generally sufficient to bring the parts back to their normal position. Should it be desired to hold the bar stationary at any given point or retard its movement, this may be accomplished by placing the foot upon the step *p* and applying the brakes to the piston-rod J, the release of said brakes being accomplished automatically by the weight *w* when the foot of the operator is removed from the step *p*.

If it be desired to employ the bar D in rolling a log upon the carriage, the trip E is brought into use through the instrumentality of the step *x*. This causes the bar to assume the position shown in dotted lines in Fig. 1, its upper end being thrown back so that in rising it passes back of the log lying next to the carriage upon the logway, but as it rises it is relieved from the action of the trip and follows the log in its movement onto the carriage.

In Fig. 3 I have shown a modification of the machine in which the sheave *b* is dispensed with and the chain G attached directly to the piston-rod; but as this method of construction requires a cylinder having the same length of stroke as the hoist of the bar D, I prefer the arrangement shown in Fig. 1, in which a cylinder of one-half the length accomplishes the same result.

Having thus described my invention, I claim as new and desire to secure by Letters Patent the following:

1. In a log-turner, the vertically reciprocating and oscillating toothed bar and the chain G, one end of which is connected to said bar and the other to a stationary support, in combination with the stationary sheave over which the chain passes, and the movable sheave attached to the piston-rod of a steam-cylinder and acting upon said chain to operate the toothed bar as the piston-rod moves in and out the cylinder.

2. In a log-turner, the vertically reciprocating and oscillating bar D, provided with rear extension, F, and the chain G, one end of which is attached to said extension and the other to the beam H, in combination with the stationary sheave *a*, vertically-moving sheave *b* being attached to the piston-rod, and acting upon the chain to raise and swing the bar when steam is admitted to the upper end of the cylinder.

3. In a log-turner, the vertically moving and oscillating toothed bar, and chain G, passing over suitable sheaves and arranged to raise and lower said bar by the movement of the piston in a steam-cylinder, in combination with the trip mechanism E, arranged to swing the bar backward when it is desired to roll logs forward or upon the log-carriage, substantially as set forth.

4. In a log-turner, the combination, with a toothed turning-bar and devices connecting the same with the piston-rod of a steam-cylinder, of the brake acting directly upon said rod to enable the operator to arrest its movement at any desired point.

5. In a log-turner, the combination of the toothed bar, the chain by which it is operated, the sheaves, the piston-rod, and steam-cylinder, to give said bar a vertical movement, the trip E, to swing it backward, and a brake arranged and operating directly upon the piston-rod, all arranged and operating as specified.

In testimony whereof I hereunto affix my signature in presence of two witnesses.

ALEXANDER RODGERS.

Witnesses:
    JAMES C. MCLAUGHLIN,
    KATIE DELANTY.